United States Patent [19]

Child et al.

[11] 4,013,578

[45] Mar. 22, 1977

[54] DETERGENT INGREDIENT

[75] Inventors: Terence Frederick Child; James Francis Davies, both of Wirral, England

[73] Assignee: Lever Brothers Company, New York, N.Y.

[22] Filed: Aug. 14, 1974

[21] Appl. No.: 497,424

[30] Foreign Application Priority Data

Aug. 15, 1973 United Kingdom ............ 38645/73

[52] U.S. Cl. .............................. 252/140; 252/160; 252/363.5; 252/539; 252/550; 252/558; 252/DIG. 15

[51] Int. Cl.² ............................................ C11D 3/12

[58] Field of Search ............... 252/140, 160, 363.5, 252/539, 550, 558, DIG. 15

[56] References Cited

UNITED STATES PATENTS 3,843,563  10/1974  Davies et al. .................... 252/547

*Primary Examiner*—Mayer Weinblatt
*Attorney, Agent, or Firm*—James J. Farrell; Melvin H. Kurtz; Kenneth F. Dusyn

[57] ABSTRACT

Finely divided calcium carbonate, which is intended for use in detergent compositions containing sodium carbonate as the detergency builder, is treated before it has been dried with a water-soluble dispersing aid. This decreases the tendency of the calcium carbonate particles to aggregate and subsequently be deposited on fabrics in the washing process.

11 Claims, No Drawings

DETERGENT INGREDIENT

The present invention concerns finely divided calcium carbonate which is prepared by precipitation from aqueous solution and is adapted for use as an ingredient in detergent compositions.

In the specification of our copending patent application 386827 we have described detergent compositions which contain an alkali metal carbonate detergency builder together with finely divided calcium carbonate, in addition to a detergent active compound or compounds. The presence of the calcium carbonate decreases the tendency of the compositions to form inorganic deposits on washed fabrics, which is normally a disadvantage of the use of alkali metal carbonate detergency builders. This is apparently because the precipitated calcium carbonate is deposited on the added calcium carbonate instead of on the fabrics or washing machine surfaces. Moreover, by encouraging the calcium hardness in the wash water to be removed from solution in this way, the detergencies of the compositions are improved. The added calcium carbonate also appears to act as a scavenger for the calcium carbonate precipitation inhibitors which we have found to be commonly present in wash liquors; this scavenging facilitates the precipitation process and further increases the effect of the added calcium carbonate.

For the achievement of the benefits of having this finely divided calcium carbonate present in the detergent compositions, it is necessary that the calcium carbonate should have a high surface area, that is at least about 5 square meters per gram ($m^2/g$), generally at least about 10 $m^2/g$ and preferably at least 20 $m^2/g$. The particularly preferred calcium carbonate has a surface area of from about 30 $m^2/g$ to about 100 $m^2/g$, especially about 50 to about 80 $m^2/g$. Calcium carbonate with surface areas in excess of about 100 $m^2/g$ could be used if such materials are economically available, but it appears to be unlikely that any higher surface areas will be achievable commercially and this may in any case be undesirable for other reasons, for example especially small particles, i.e. with very high surface areas, may have a tendency to be adsorbed onto fabrics during the washing process and there may be dust problems.

It is necessary to use in the detergent compositions an amount of calcium carbonate of at least about 5% and preferably at least about 10% up to about 60%, more preferably about 10% to about 40% by weight of the compositions.

It is of course important to prevent the added calcium carbonate from itself being deposited on the washed fabric. Normally, this can be achieved by thoroughly dispersing the calcium carbonate in the wash liquor together with the other detergent ingredients before the fabrics are added. However, during mis-use of the detergent compositions, especially if the compositions are added to the wash liquors after the fabrics, the particles of the compositions can become trapped in the folds of the fabrics, and there can be found to be appreciable deposition of the added calcium carbonate on the fabrics.

We have now found that calcium carbonate which has been treated before it has been dried, either during or after its manufacture by chemical precipitation, by the addition of certain water-soluble dispersing aids, has a decreased tendency for the very fine calcium carbonate particles to aggregate and subsequently be deposited on fabrics during the washing process.

Accordingly, the present invention provides a process for treating finely divided calcium carbonate in aqueous dispersions by contacting the calcium carbonate with a water-soluble dispersing aid. The invention includes finely divided calcium carbonate which has been treated according to the invention, and a detergent composition comprising the treated calcium carbonate.

Early treatment of the calcium carbonate with the dispersing aid is generally preferable, especially where the calcium carbonate is subjected to any treatment between its formation by chemical precipitation and eventual drying which would encourage aggregation, for example any steps to increase the concentration of the calcium carbonate in the reaction product. However, provided the calcium carbonate is not previously aggregated unduly, it may be satisfactory to delay its treatment with the dispersing aid until during detergent slurry making, as aggregation is promoted particularly in the spray drying process to form a detergent powder.

The calcium carbonate used may take any crystalline form, but calcite is preferred as aragonite and vaterite appear to be more difficult to prepare with high surface areas, and it appears that calcite is a little less soluble than aragonite or vaterite at more usual wash temperatures. When any aragonite or vaterite is used it is generally in admixture with calcite. Finely divided calcium carbonate can be prepared conveniently by chemical precipitation processes, preferably by passing carbon dioxide into a suspension of calcium hydroxide. Other chemical precipitation reactions may be employed to produce the calcium carbonate, especially the reaction between any relatively soluble calcium salt and any soluble carbonate salt, for example by reaction between calcium sulphate or calcium hydroxide and sodium carbonate, but these reactions also form undesirable dissolved salts, i.e. sodium sulphate and sodium hydroxide in the examples mentioned, which means that the calcium carbonate has to be filtered from the reaction product before its use unless the dissolved salts can be tolerated in the detergent compositions. Suitable forms of calcium carbonate, especially calcite are commercially available. The calcium carbonate is preferably in substantially pure form, but this is not essential and the calcium carbonate used may contain minor amounts of other cations with or without other anions or water molecules.

As an indication of the general relationship between particle size and surface area, we have found that calcite with a surface area of about 50 $m^2/g$ has an average primary crystal size (diameter) of about 250 Angstrom (A), whilst if the primary crystal size is decreased to about 150 A the surface area increases to about 80 $m^2/g$. In practice some aggregation takes place to form larger particles, despite the use of the dispersing aids according to this invention. But it is desirable that the aggregated particle size of the calcium carbonate should be fairly uniform, and in particular that there should be no appreciable quantity of large particles which could easily get trapped in the fabrics being washed or cause abrasive damage to washing machine parts.

Surface areas of the finely divided calcium carbonate are determined by the standard Brunauer, Emmet and Teller (BET) method, using an AREA-meter made by Ströhlein & Co., and operated according to the suppliers' instruction manual. The procedure for degassing the samples under investigation is usually left to the operator, but we have found that a degassing procedure in which the samples are heated for 2 hours at 175° C under a stream of dry nitrogen is effective to give repeatable results.

It should be mentioned that the calcium carbonate may be adsorbed onto a substrate when it is formed, in which case it may not be possible to measure accurately by the BET method the surface area of the calcium carbonate alone. The effective surface areas can then be deduced by checking the effectiveness of the calcium carbonate and relating this to the effectiveness of calcium carbonates of known surface areas. Alternately, it may be possible to use electron microscopy to determine the average particle size, from which an indication of surface area might be obtained, but this should be checked by determining the effectiveness of the calcium carbonate in use.

The calcium carbonate is preferably prepared in the form of a concentrated aqueous suspension or slurry, which can be used directly in the preparation of detergent compositions. Thus, the calcium carbonate is generally present to the extent of at least about 5%, especially at least about 10% by weight in the aqueous suspension and more preferably from about 20% to 40% by weight. At high calcium carbonate levels the product is a viscous slurry which gives handling problems, so there is a practical maximum content of calcium carbonate of about 50 % by weight. However, this depends on the type of calcium carbonate used, as the higher surface area calcium carbonates have a greater slurry thickening effect than relatively coarse calcium carbonates, and on the effect on slurry viscosity of any additives which may be present, for example sodium toluene sulphonate and sodium alkyl benzene sulphonates which tend to decrease slurry viscosity. It will be appreciated that the less water that is present in the slurry gives less water to evaporate subsequently in the preparation of a particulate detergent composition, to economic advantage.

The dispersing aid may take a variety of chemical forms, several of which have the advantage of having other useful properties which are beneficial in detergent compositions. For example, certain anionic detergent active compounds are especially good dispersing aids. However, it may be noted that the efficacy of a material as a dispersing aid cannot positively be predicted, and it is found that otherwise similar compounds may often act quite differently in this respect. It will be appreciated that when the calcium carbonate is intended for use in a detergent composition, the dispersing aid should not be toxic or highly coloured, or otherwise unsuitable for use in a detergent composition.

The test to ascertain whether or not a compound is a dispersing aid is as follows:

DISPERSING AID TEST

An aqueous suspension of calcite (Calofort U50 supplied by J. & E. Sturge Limited of Birmingham, England having a norminal surface area of about 50 m²/g) is prepared containing 0.5% by weight of the calcite. To ensure thorough dispersion of the calcite the suspension is agitated with an ultrasonic probe and then an amount of the material under test is thoroughly admixed with the slurry. The treated calcite suspension is then filtered through fine filter paper to give a cake of calcite which is oven-dried, after which the dried cake is manually ground in a mortar and pestle to form a fine powder.

The dried treated calcite is then resuspended in water containing 12° (French) Ca hardness and enough sodium carbonate is then added in aqueous solution to precipitate the hardness ions in simulation of a detergency building situation, the final concentration of calcite and sodium carbonate being 0.12% and 0.105%, respectively, in 1 liter of water. The resultant suspension is then agitated in a Terg-O-Tometer under repeatable conditions (100 rpm) at 60° C for 10 minutes, and the solution is then filtered under standard conditions of suction through a circle of black cotton twill close-weave cloth in a Büchner funnel. The cloth and any sediment are then allowed to dry in air at ambient temperature and the amount of deposit is then graded on a 5-point whiteness scale as follows:

| | |
|---|---|
| 0 | no deposit |
| 1 | trace of deposit |
| 2 | light deposit |
| 3 | moderate deposit |
| 4 | heavy deposit |
| 5 | very heavy deposit |

In the absence of an effective dispersing aid in this test the white deposit on the cloth has a grading of 5, showing that during the drying process there is considerable formation of aggregates of calcite particles, which do not pass through the filter cloth. Any materials which in this test produces a lower cloth grading is a dispersing aid at the level used, but the preferred materials give cloth deposit gradings of 2 or 3; in this severe test results of 0 or 1 are not normally achievable, but dispersing aids giving gradings of 2 or 3 are quite effective in practice.

It may be noted that the test could be done with another type of calcium carbonate, especially calcite, provided it has a very high surface area and that the same calcite is used throughout any series of tests, but Calofort U50 calcite has been found to be particularly good. Use of a single bulk supply of calcite has been found to be more reliable, and more convenient, than a test procedure in which the calcite is actually formed by precipitation. The ultrasonic agitation of the calcite dispersion ensures that the calcite particles are not aggregated before the dispersing aid under test is added, which can be confirmed by passing the initial calcite dispersion through the black filter cloth when no deposit should be found.

Two broad classes of materials have been found to provide effective dispersing aids, namely certain detergent compounds which appear to have some affinity for calcium carbonate molecules, and polyelectrolytes which have a relatively low molecular weight (up to about 30,000) giving satisfactory water solubility, and which again have some affinity for calcium carbonate. The mechanism by which the dispersing aids function is not definitely known, but it appears that the dispersing aids interact with the surface of the calcium carbonate particles so as to provide adsorbed layers which hinder the close approach of calcite particles during the drying process and thereby inhibit aggregation whilst facilitating subsequent redispersion in water when the detergent compositions are used.

Amongst the detergent compounds the following types of compound may be mentioned as being suitable, it being understood that the optimum properties depend on the proper choice of carbon-chain length or molecular weight, which can be assessed by the dispersing aid test described above:

Alkali metal alkyl benzene sulphonates (eg alkyl $C_{16}$–$C_{18}$)
Alkali metal alkyl sulphates (eg alkyl $C_{12}$–$C_{14}$)
Alkali metal ethoxylated alcohol sulphates (eg alkyl $C_{18}$)
Alkali metal olefin sulphonates (eg alkyl $C_{16}$–$C_{18}$)
Ethoxylated alcohols (eg alkyl $C_{11}$–$C_{15}$)
Sugar esters and polyhydroxyalcohol sugar esters
Alkyl ethanolamides and ethoxylated ethanolamides (eg alkyl $C_{10}$–$C_{12}$)

Amongst the polyelectrolytes the following types of compounds may be mentioned as being suitable, again with selection of the optimum compounds by dispersing aid test:

Sodium carboxymethylcellulose
Sodium alginate
Polyvinyl alcohol
Hydroxyethylcellulose
Gelatine It may be mentioned that certain condensed phosphate detergency builders, such as sodium tripolyphosphate, are effective dispersing aids, but they also appear to interfere with the action of the calcium carbonate and hence tend to decrease detergency. Thus, these condensed phosphates should not be used as dispersing aids for calcium carbonate for detergent use.

The amount of the dispersing aids used can be generally from about 1% up to about 50% by weight of the calcium carbonate, but is preferably from about 5–25% by weight of the calcium carbonate. It will be appreciated that the more effective dispersing aids are generally used at the lower levels and this is generally preferred. However, some relatively ineffective dispersing aids may if desired be used at the high levels, especially where the same materials have other useful properties in the detergent compositions, but it should be noted that with some dispersing aids, there is a optimum level of use which if exceeded can result in increased deposition, presumably due to an opposite aggregation effect at the higher concentrations.

As mentioned above, it is necessary to treat the calcium carbonate with the dispersing aids when in aqueous dispersion in order for the treatment to be effective. But it may be noted that besides the effect of the finely divided calcium carbonate on the viscosity of the aqueous dispersions, some of the dispersing aids have thickening effects, which may limit the concentrations of the aqueous dispersions which can be used.

The treatment of finely divided calcium carbonate, especially finely-ground calcite, has been proposed hitherto particularly to facilitate the incorporation of the calcite into products such as rubber. In this case the calcite may be treated to provide a hydrophobic surface, for example by using certain organic materials, or the calcite may be treated with so-called protective colloids to inhibit growth of the calcite particles. Most of the materials which have been proposed hitherto for such treatment of calcium carbonate are not effective as dispersing aids for the purpose of the present invention. It may also be noted that hitherto the calcium carbonate has been treated in dry form. However, this we find to be much less effective for inhibiting aggregation for detergents use than the treatment of the calcite carbonate with dispersing aids before the calcium carbonate has been dried, in accordance with the present invention.

In the preparation of detergent compositions the treated calcium carbonate suspensions with an alkali metal carbonate, detergent active compounds and any other desired ingredients are conveniently admixed, preferably under vigorous agitation, to give detergent slurries which can be spray dried to form detergent powders, using conventional techniques. However, if desired the treated calcium carbonate may be dried and then admixed with other detergent ingredients to form the detergent compositions by any conventional detergent processing techniques.

The alkali metal carbonate used in the detergent compositions is preferably sodium or potassium carbonate or a mixture thereof, for reasons of cost and efficiency. The carbonate salt is preferably fully neutralised, but it may be partially neutralised, for example a sesquicarbonate may be used in partial replacement of the normal carbonate salt; the partial salts are less alkaline and therefore less efficient. The amount of the alkali metal carbonate in the detergent composition can be varied widely, but the amount should be at least about 10% by weight, preferably from about 20% to 60% by weight, though an amount of up to about 75% could possibly be used if desired in special products. The amount of the alkali metal carbonate is determined on an anhydrous basis, though the salts may be hydrated either before or when incorporated into the detergent composition. It should be mentioned that within the preferred range the higher levels tend to be required under conditions of use at low product concentrations, as is commonly the practice in North America, and the converse applies under conditions of use at higher product concentrations, as tends to occur in Europe. It should be noted that it may also be desirable to limit the carbonate content to a lower level within the range mentioned, so as to decrease the risk of internal damage following any accidental ingestion, for example by children.

As mentioned earlier, the amount of treated calcium carbonate used in the detergent compositions should be from about 5 up to about 60% by weight of the compositions. Within this broad range, the lower levels of calcium carbonate may be satisfactory under certain conditions of use and with particularly effective calcium carbonates. However, with less effective calcium carbonates, and especially under conditions of use at low product concentrations, as for example under typical North American washing conditions, it is preferred to use higher levels of calcium carbonate within the preferred range mentioned. The surface area of the calcium carbonate very markedly affects its properties, with high surface area materials being more effective, so that lower amounts of such materials can be used to good effect in comparison with calcium carbonate of low surface area.

In addition to the essential alkali metal carbonate and finely divided calcium carbonate treated with a dispersing aid as described above, it is necessary to include in the detergent compositions an amount of a nonionic, anionic, amphoteric or zwitterionic detergent active compound, or a mixture thereof. It is desirable that the detergent active compound or compounds used should not form during use at normal product concentration in hard water excessively water-insoluble calcium salts;

this ensures that the detergent active compound is not completely precipitated as its calcium salt instead of calcium carbonate being precipitated. Some degree of precipitation of the detergent active compound or mixture of compounds in the form of the calcium salts may be tolerated, provided that after allowing for the subsequent redissolution of any of the calcium salt during the washing process, the amount of any more permanent precipitate is minor and that an effective amount of detergent active compound is left in solution. Thus, the detergent active compound should not be wholly soap, which if added with the sodium carbonate and calcium carbonate would tend to be precipitated too rapidly in the form of its calcium soap, and calcium tallow soap is so insoluble that it does not revert subsequently to the sodium soap, because the calcium soap is less soluble than the calcium carbonate (as measured by the free $Ca^{++}$ concentration). However, a little soap may be present with other detergent active compounds, as for example in binary or ternary active low sudsing products, where the presence of the soap influence the lather properties, though it does not act as a detergent active compound after its precipitation as the calcium soap.

Many suitable synthetic detergent active compounds are commercially available and they are fully described in the literature, for example in "Surface Active Agents and Detergents" Volumes 1 and 2, by Schwartz, Perry & Berch. Preferred detergent active compounds which can be used include nonionic detergent active compounds which are not calcium sensitive and anionic detergent active compounds which either form water-soluble calcium salts, as for example with certain alkyl ether sulphates, or which tend to form only slightly insoluble calcium salts when used alone but which are used in conjunction with other solubilising compounds, especially other detergent active compounds, for example mixtures of certain alkyl benzene sulphonates with nonionic detergent active compounds, and some mixed olefin sulphonates of which some of the olefin sulphonate constituents appear to act as solubilising agents for the other less-soluble constituents.

A more detailed description of specific nonionic, anionic, amphoteric or zwitterionic and mixtures thereof, detergent active compounds which can be used in the detergent compositions is to be found in the specification of our copending patent application mentioned above.

It may be noted that several detergent active compounds are also effective dispersing aids, and it is preferred that the dispersing aids used are detergent active compounds so as to get the benefit of this dual function. However, it is not sufficient merely to have a dispersing aid added to a detergent composition with calcium carbonate, as this does not necessarily inhibit aggregation and hence decrease fabric deposition. It is an essential feature of the invention that the calcium carbonate of high surface area should be treated with a dispersing aid in aqueous dispersions before the calcium carbonate has been dried.

The effective amount of the detergent active compound or compounds used in the compositions of the present invention is generally in the range of from about 5 to 40% by weight, preferably from about 10 to about 25% by weight of the composition. It may be noted that the choice of the detergent active compound or compounds used and their amounts appear to influence the precipitation of calcium carbonate, and hence can have a very marked effect both on detergency and on fabric deposition. The type of detergent active compounds used therefore influences the optimum level and type of added calcium carbonate, but in general it is best to use calcite of highest surface area, commensurate with cost considerations, at the minimum level to give satisfactory detergency and adequate inorganic deposition control, bearing in mind the necessity to leave sufficient "room" in the detergent compositions for other essential and optional ingredients.

In addition to the essential alkali metal carbonate and the calcium carbonate it is possible to include in the detergent compositions minor amounts of other detergency builders, provided that the total amount of the detergency builders does not exceed about 85% by weight, so as to leave room in the detergent compositions for other essential ingredients. One such detergency building ingredient is an alkali metal silicate, particularly sodium neutral, alkaline, meta- or orthosilicate. A low level of silicate, for example, about 5–10% by weight, is usually advantageous in decreasing the corrosion of metal parts in fabric washing machines, and it may give processing benefits. If higher levels of silicate are used up to a practical maximum of about 30%, for example from about 10% to 20% by weight, there can be a more noticeable improvement in detergency, which may permit some decrease in the alkali metal carbonate content. This effect appears to be particularly beneficial when the compositions are used in water with appreciable levels of magnesium hardness. The amount of silicate can also be used to some extent to control the pH of the composition, which is generally within the range of about 9–11, preferably 10–11 for an aqueous solution of the composition at the recommended concentration. It should be noted that a higher pH (i.e. over about pH 10.5) tends to be more efficient as regards detergency, but it may be less desirable for domestic safety. Sodium silicate is commonly supplied in concentrated aqueous solution, but the amounts are calculated on an anhydrous basis.

Other detergency builders can be present in minor amounts if desired, for example other so-called precipitant builders which form insoluble calcium salts, some of which can have a desirable fabric softening effect, or some sequestrant builders. It should be noted, however, that some detergency builders can have a marked detrimental effect on calcium carbonate precipitation. Sodium tripolyphosphate is a particularly strong calcium carbonate precipitation inhibitor, and it is desirable to exclude its presence from the detergent compositions quite apart from eutrophication considerations. In practice, due to plant contamination, its presence at low levels of, say up to about 0.5% by weight may be unavoidable in the detergent compositions, but it is preferred to have a maximum level of about 0.05% phosphorous, which is equivalent to about 0.2% sodium tripolyphosphate.

A more detailed description of other detergency builders and of other conventional additives which can be present in the detergent compositions is also to be found in the specification of our copending patent application mentioned above.

The detergent compositions may take any of the common physical forms associated with fabric washing detergent compositions, such as powders, granules, cakes and liquids, but the present invention is of most benefit for detergent compositions in solid form, especially powders, as the drying step tends to encourage aggregation of the calcium carbonate which the presence of the dispersing aid is intended to overcome.

The present invention is illustrated by the following Examples in which parts and percentages are by weight, except where otherwise indicated.

EXAMPLES 1 to 13

A slurry of calcite (surface area about 30 m²/g) was prepared by reaction between carbon dioxide and calcium hydroxide in aqueous dispersion. An amount of a dispersing aid was then added with stirring to the slurry, which was subsequently air dried at room temperature. Aqueous detergent liquors were made up containing 0.12% calcium carbonate, an amount of dispersing aid dependent on the amount added to the slurry and 0.105% sodium carbonate in 12° Ca hardness water. The liquors were agitated under repeatable conditions in a Terg-0-Tometer at 60° C for 10 minutes and then filtered through black cotton twill close-weave cloths and the amount of the calcium carbonate deposit on the cloth was assessed as described in the dispersing aid test above. The results were as follows, including the result for a comparative test A where no dispersing aid was used.

| Ex | Dispersing aid | Amount[5] | Black cloth grade |
|---|---|---|---|
| A | None | — | 5 |
| 1 | Coconut monoethanolamide | 0.05 | 2 |
| 2 | Hydroxyethylcellulose | 0.025 | 3 |
| 3 | Tergitol 15-S-3[1] | 0.05 | 3 |
| 4 | Polyvinylalcohol 51-05[2] | 0.025 | 3 |
| 5 | Palm kernel monoethanolamide | 0.05 | 3 |
| 6 | Ethylene glycol glucoside monostearate | 0.05 | 1 (spotted) |
| 7 | Sodium tallow alcohol sulphate | 0.025 | 2 |
| 8 | Sodium alginate | 0.025 | 2 |
| 9 | Polyvinyl alcohol[3] | 0.025 | 3 |
| 10 | Sucrose monostearate | 0.05 | 2 |
| 11 | Alfol-14-sulphate[4] | 0.025 | 3 |
| 12 | Sodium tallow alcohol-3EO sulphate | 0.025 | 2 |
| 13 | Gelatine | 0.025 | 3 |

[1]Secondary linear ($C_{10}$-$C_{15}$) alcohol condensate with 3 moles of ethylene oxide (EO)
[2]MW 20,000
[3]MW 30,000
[4]Sodium linear secondary ($C_{11}$-$C_{14}$) alkyl sulphate
[5]% amount in the detergent liquor (i.e. either 41.7% or 20.8% of the calcite level)

Subsequent tests showed that the benefits of the dispersing aids in decreasing the calcium carbonate aggregation were found in practical washing tests and that the presence of the dispersing aids did not detract from the detergency building properties when using the treated calcium carbonate.

EXAMPLES 14 to 29

The procedure of Examples 1 to 13 was repeated except that the calcite had a surface area of about 35 m²/g using ranges of detergent active compounds as follows:

| Ex | Material tested as dispersing aid | Amount %[1] | Black cloth grade |
|---|---|---|---|
| 14 | Sodium $C_8$ alkyl benzene sulphonate | 20 | 5+ |
| 15 | Sodium $C_{13}$ alkyl benzene sulphonate | 20 | 5+ |
| 16 | Sodium $C_{16}$ alkyl benzene sulphonate | 20 | 3-4 |
| 17 | Sodium $C_{18}$ alkyl benzene sulphonate | 20 | 3 |
| 18 | Caprylic diethanolamide | 20 | 5+ |
| 19 | Lauric isopropanolamide | 20 | 4+ |
| 20 | Capric diethanolamide | 20 | 4 |
| 21 | Coconut monoethanolamide - 10 EO | 20 | 4 |
| 22 | Coconut monoethanolamide - 3 EO | 20 | 5+ |
| 23 | Sodium $C_{12}$ alkane sulphonate | 20 | 5+ |
| 24 | Sodium $C_{16}$ alkane sulphonate | 20 | 5+ |
| 25 | Sodium $C_{18}$ alkane sulphonate | 15 | 5 |
| 26 | Sodium laurate | 20 | 5+ |
| 27 | Sodium palmitate | 20 | 5+ |
| 28 | Sodium $C_{18}$ α-olefin sulphonate | 15 | 3 |
| 29 | Sodium $C_{14}$ α-olefin sulphonate | 15 | 5 |

[1]% of the material tested as dispersing aid, based on the weight of calcite.

Comparison of the results show the criticality of the chain length for some materials to be effective dispersing aids. Examples 14 to 17 show that the $C_{16}$ and $C_{18}$ alkyl benzene sulphonates are dispersing aids whilst the $C_8$ and $C_{13}$ materials are not. Examples 18 to 20 show that the shorter chain (caprylic) alkanolamide is not an effective dispersing aid compared with the lauric and capric compounds. Examples 21 and 22 show the benefit of the longer (10 E0) ethylene oxide chain compared with the −3 E0 compound. Examples 23 to 25 and Examples 26 and 27 show that the alkane sulphonates and soaps do not function as dispersing aids (the soaps appear to have the opposite effect of encouraging aggregation). Examples 28 and 29 show that the longer chain ($C_{18}$) olefin sulphonate is a more effective dispersing aid whilst the $C_{14}$ material is not.

EXAMPLES 30 to 33

The procedure of Example 28 was repeated except that the amount of the $C_{18}$ α-olefin sulphonate was varied as follows:

| Ex | Amount | Black cloth grade |
|---|---|---|
| 30 | 14 | 3 |
| 31 | 10 | 4 |
| 32 | 6 | 5 |
| 33 | 2 | 5+ |

These results show the optimum concentration of the olefin sulphate on the calcite to be about 14%.

EXAMPLE 34

The procedure of Example 30 was repeated but the dispersing aid used was an ethoxylated tallow alcohol (2 E0) oxidised to give a terminal carboxyl group (obtained as 'Alkypo' T20). The black cloth grading was 3. When the test was repeated using the same test but with the calcite having been dried before its treatment with the dispersing aid, the black cloth grading was 5 showing that the treatment must be on undried calcite to be effective. When the procedure was repeated but using coconut monoethanolamide as the dispersing aid at 10% based on the calcite, a black cloth grade of 2 was achieved, as against a black cloth grade of 4 using the same dispersing aid when the calcite had been dried prior the treatment.

EXAMPLES 35 to 38

The procedure of Examples 14 to 19 was repeated with different materials tested as dispersing aids as follows:

| Ex | Material | Amount | Black cloth grade |
|----|----------|--------|-------------------|
| 35 | Sodium $C_{12}$ alkyl sulphate | 5% | 4 |
| 36 | Sodium $C_{14}$ alkyl sulphate | 5% | 3 |
| 37 | Sodium $C_{16}$ alkyl sulphate | 5% | 5 |
| 38 | Sodium $C_{18}$ alkyl sulphate | 5% | 5 |

EXAMPLE 39

The procedure of Examples 1 to 13 was repeated except the the calcite used had a surface area of about 25 m²/g. Two dispersing aids, namely coconut monoethanolamide and sodium secondary linear ($C_{11}$–$C_{15}$) alkyl benzene sulphonate were used at 10% based on the calcite, to give black cloth gradings of 2 and 3 respectively.

EXAMPLE 40

The procedure of Examples 1 to 13 was repeated except that the calcite used had a higher surface area of about 75 m²/g, and was treated in 37% slurry with 2% (based on the weight of calcite) of dextran sulphate. The treated calcite was then dried and its black cloth grade found to be 4, whilst the untreated calcite gave a black cloth grade of 5. It was also noted that the presence of the dextran sulphate gave a marked lowering of slurry viscosity which enabled the treatment to be done at a concentration higher than would otherwise be usual.

EXAMPLES 41 to 45

A series of detergent compositions were prepared to the following formulation:

| Ingredient | % |
|------------|---|
| Sodium carbonate | 35 |
| Calcium carbonate | 40 |
| Sodium ($C_{11}$–$C_{15}$) alkyl benzene sulphonate | 16 |
| Sodium silicate | 5 |
| Water | to 100 |

The calcium carbonates were previously treated in aqueous dispersion with coconut monoethanolamide as the dispersing aid (10% on the calcium carbonate) as follows, with the black cloth gradings of the compositions.

| Ex | Calcium carbonate type | Surface area m²/g | Black cloth grading |
|----|------------------------|-------------------|---------------------|
| 41 | Calcite | 35 | 1 |
| 42 | Calcite | 25 | 1 |
| 43 | Aragonite/calcite (80:20) | 7 | 3 |
| 44 | Vaterite | 10 | 1 |
| 45 | Calcite | 10 | 2 |

Similar good black cloth grading results were achieved when the alkyl benzene sulphonate was replaced by a nonionic detergent active compound, Tergitol 15-S-9 ( sec. $C_{11}$–$C_{15}$ alcohol condensate with 9 EO).

EXAMPLES 46 and 47

A slurry of undried calcite (surface area about 35 m²/g) was treated by the addition of 15% or 30% of sodium ($C_{14}$–$C_{15}$) alkyl sulphate based on the weight of calcite, and the treated slurries were then dried. The dried calcite powders were then used to form detergent powders by spray-drying to give products of the following formulations:

| Ingredient | % Ex. 45 | % Ex. 46 |
|------------|----------|----------|
| Sodium ($C_{11}$–$C_{15}$) alkyl benzene sulphonate | 8 | 6 |
| Nonionic detergent compound[1] | — | 2 |
| Soap | — | 3 |
| Sodium carbonate | 40 | 30 |
| Alkaline silicate | 15 | 11 |
| Sodium toluene sulphonate | .1 | 1 |
| Perborate | — | 15 |
| Calcite | 20 | 20 |
| Sodium alkyl ($C_{14}$–$C_{15}$) sulphate[2] | 6 | 3 |
| Water | to 100 | to 100 |

[1]Tergitol 15-S-9 (condensation product of sec. $C_{11}$-$C_{15}$ alcohol with 9 EO)
[2]Dispersing aid added at 30% on calcite in Example 45 and 15% on the calcite in Example 46.

The product of Example 45 was formulated to be suitable for use as a high sudsing heavy duty powder to be used under North American wash conditions, whilst the composition of Example 46 was formulated as a low-sudsing heavy duty product for use under European wash conditions. When these products were evaluated in washing machine tests they washed satisfactorily and did not leave objectionable deposits on the washed fabrics. Comparative products in which the calcite was not treated with the dispersing aid prior to drying were significantly inferior in this respect.

What is claimed is:

1. A process for treating finely divided calcium carbonate having a surface area of from about 5 to about 100 square meters per gram (m²/g) by contacting the calcium carbonate before said calcium carbonate has been dried with about 1% to about 50% by weight of the calcium carbonate of a water soluble dispersing aid in aqueous dispersion at a concentration of not more than 50% by weight of calcium carbonate, said dispersing aid being selected from the group consisting of alkali metal alkyl benzene sulphonates, alkali metal alkyl sulphates, alkali metal ethoxylated alcohol sulphates, alkali metal olefin sulphonates, ethoxylated alcohols, sugar esters, polyhydroxy alcohol sugar esters, alkyl ethanolamides, ethoxylated ethanolamides, sodium carboxymethylcellulose, sodium alginate, polyvinyl alcohol, hydroxyethylcellulose, gelatine, and mixtures thereof, and subsequently drying the treated calcium carbonate to impart a decreased tendency to aggregation of the treated calcium carbonate particles.

2. A process according to claim 1, wherein the calcium carbonate has a surface area of at least about 20 m²/g.

3. A process according to claim 1, wherein the calcium carbonate is calcite.

4. A process according to claim 1, wherein the calcium carbonate is contacted with the dispersing aid in aqueous dispersion at a concentration of from about 5% to about 40% by weight of calcium carbonate.

5. A process according to claim 1, wherein the dispersing aid is selected from the group consisting of alkali metal alkyl ($C_{16}$–$C_{18}$) benzene sulphonates, alkali metal alkyl ($C_{12}$–$C_{14}$) sulphates, alkali metal ethoxylated alcohol ($C_{18}$) sulphates and alkali matal olefin ($C_{16}$–$C_{18}$) sulphonates.

6. A process according to claim 1, wherein the amount of the dispersing aid is from about 5% to about 25% by weight of the calcium carbonate.

7. A process according to claim 1, wherein the dispersing aid is an ethoxylated alcohol ($C_{11}$–$C_{15}$) surface active agent.

8. A process according to claim 2, wherein the calcium carbonate has a surface area of from about 30 to about 100 $m^2/g$.

9. A process according to claim 5, wherein the dispersing aid is a sodium alkyl $C_{12}$–$C_{14}$ sulphate detergent active compound.

10. Finely divided calcium carbonate having a surface area of at least about 5 square meters per gram treated before said calcium carbonate had been dried with about 1% to about 50% by weight of the calcium carbonate of a water soluble dispersing aid selected from the group consisting of alkali metal alkyl benzene sulphonates, alkali metal alkyl sulphates, alkali metal ethoxylated alcohol sulphates, alkali metal olefin sulphonates, ethoxylated alcohols, sugar esters and polyhydroxy alcohol sugar esters, alkyl ethanolamides and ethoxylated ethanolamides, sodium carboxymethylcellulose, sodium alginate, polyvinyl alcohol, hydroxyethylcellulose and gelatine, said treated calcium carbonate having a decreased tendency to aggregation of the calcium carbonate particles.

11. A detergent composition comprising from about 5% to about 40% of a synthetic nonionic, anionic, amphoteric or zwitterionic detergent active compound, from about 10% to about 75% of sodium or potassium carbonate detergency builder and from about 5% to about 60% of finely divided calcium carbonate previously treated with a dispersing aid according to claim 10.

* * * * *